(12) United States Patent
Mazzini

(10) Patent No.: US 11,117,592 B2
(45) Date of Patent: Sep. 14, 2021

(54) METHOD AND APPARATUS FOR AUTOMATIC ADJUSTMENT OF A VEHICLE TO A PREDETERMINED PERFORMANCE CONDITION

(71) Applicant: Solaredge Technologies Ltd., Herzeliya (IL)

(72) Inventor: Samuele Mazzini, Umbertide (IT)

(73) Assignee: Solaredge Technologies Ltd., Herzeliya (IL)

(*) Notice: Subject to any disclaimer, the term of this patent is extended or adjusted under 35 U.S.C. 154(b) by 223 days.

(21) Appl. No.: 16/326,543

(22) PCT Filed: Aug. 22, 2017

(86) PCT No.: PCT/IT2017/000179
§ 371 (c)(1),
(2) Date: Feb. 19, 2019

(87) PCT Pub. No.: WO2018/037432
PCT Pub. Date: Mar. 1, 2018

(65) Prior Publication Data
US 2019/0210611 A1   Jul. 11, 2019

(30) Foreign Application Priority Data
Aug. 25, 2016 (IT) .................. 102016000087202

(51) Int. Cl.
*B60W 50/00* (2006.01)
*B60C 11/24* (2006.01)
(Continued)

(52) U.S. Cl.
CPC ....... *B60W 50/0098* (2013.01); *B60C 11/246* (2013.01); *B60C 23/02* (2013.01);
(Continued)

(58) Field of Classification Search
CPC ................................ B60W 50/0098
See application file for complete search history.

(56) References Cited

U.S. PATENT DOCUMENTS 5,070,959 A * 12/1991 Grabowski ............. B60L 15/20
180/167
6,317,677 B1 * 11/2001 Monzaki ............ B60K 31/0075
701/84
(Continued)

FOREIGN PATENT DOCUMENTS

CN   104712449 A   6/2015
FR   3008944 A1    1/2015
(Continued)

OTHER PUBLICATIONS

International Search Report and Written Opinion dated Jan. 23, 2018 for counterpart PCT Application No. PCT/IT2017/000179.

*Primary Examiner* — Alex C Dunn
(74) *Attorney, Agent, or Firm* — Banner & Witcoff, Ltd.

(57) ABSTRACT

A method for automatic adjustment of the performance of a vehicle including the steps of detecting at least one significant physical quantity for checking the performance of the vehicle; defining at least one pair of reference indicators correlated with that physical quantity; saving at least one value of a said reference indicator in a predetermined nominal reference condition; detecting at least one value of a said reference indicator in a real operating condition of the vehicle; comparing said nominal reference indicator and real reference indicator and, if their values are different from each other, and implementing a correction of the driving power of the vehicle to compensate for the difference ascertained.

15 Claims, 4 Drawing Sheets

(51) Int. Cl.
  *B60C 23/02* (2006.01)
  *B60C 23/20* (2006.01)
(52) U.S. Cl.
  CPC ..... *B60C 23/20* (2013.01); *B60W 2050/0088* (2013.01); *B60W 2300/28* (2013.01); *B60W 2520/105* (2013.01); *B60W 2530/10* (2013.01); *B60W 2530/20* (2013.01); *B60W 2540/22* (2013.01); *B60W 2710/0644* (2013.01); *B60W 2710/0666* (2013.01); *B60W 2710/0677* (2013.01); *B60Y 2200/114* (2013.01)

(56) References Cited

U.S. PATENT DOCUMENTS

| | | | | |
|---|---|---|---|---|
| 6,374,173 | B1* | 4/2002 | Ehlbeck | B60K 31/047 701/93 |
| 7,350,611 | B2* | 4/2008 | Betz | B60W 20/10 180/69.3 |
| 8,594,868 | B2* | 11/2013 | Kell | A61G 5/043 701/22 |
| 9,884,630 | B1* | 2/2018 | Ross | B60W 10/18 |
| 2010/0114437 | A1* | 5/2010 | Boss | B60W 10/22 701/48 |
| 2011/0307133 | A1* | 12/2011 | Brandon | B60W 50/0098 701/22 |
| 2013/0342341 | A1* | 12/2013 | Simmerman | B60C 23/0498 340/449 |
| 2015/0135800 | A1* | 5/2015 | Israelsson | G08G 1/096758 73/8 |
| 2017/0225688 | A1* | 8/2017 | Milanese | B60W 40/10 |
| 2017/0297564 | A1* | 10/2017 | Xi | G05D 1/0088 |
| 2018/0290646 | A1* | 10/2018 | Graf | B60W 20/12 |
| 2020/0122534 | A1* | 4/2020 | Glugla | B60T 8/175 |

FOREIGN PATENT DOCUMENTS

| | | | | |
|---|---|---|---|---|
| GB | 2516035 A | * | 1/2015 | ............. F01N 9/005 |
| GB | 2516035 A | | 1/2015 | |

\* cited by examiner

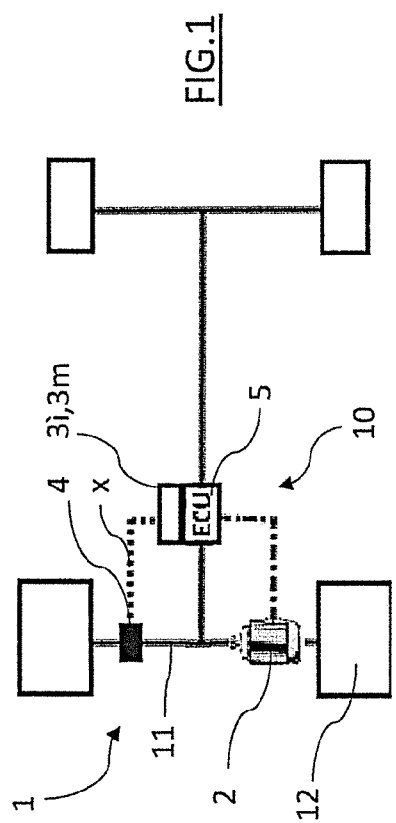
FIG.1
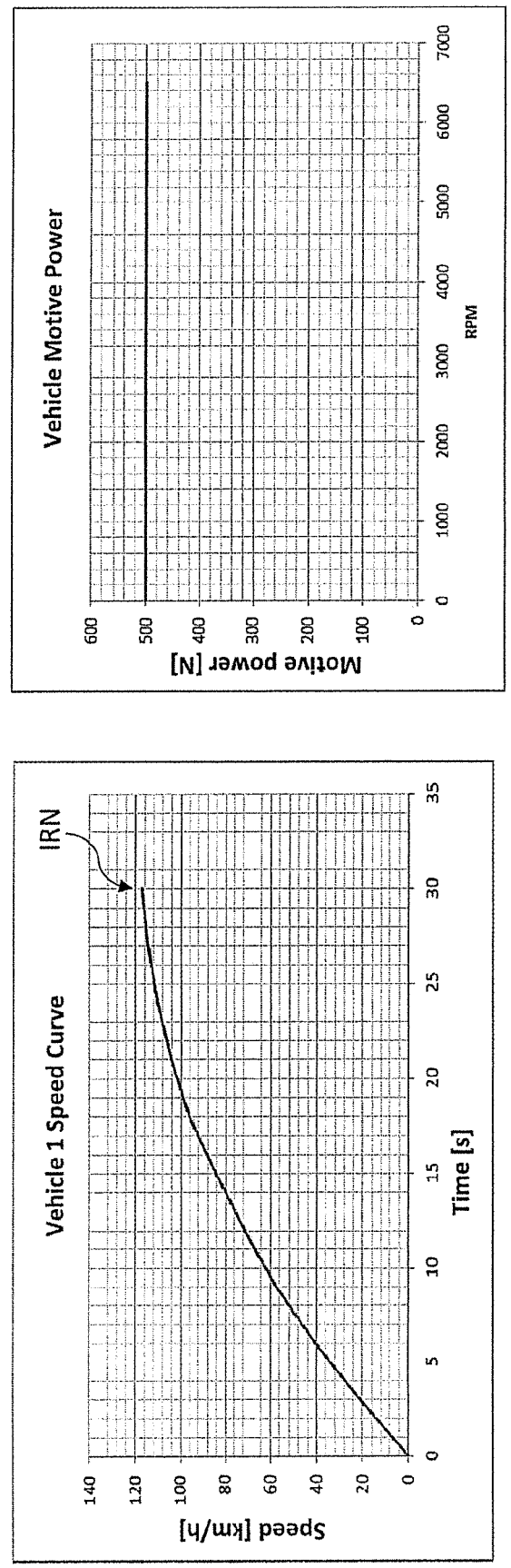
FIG.2
FIG.3

METHOD AND APPARATUS FOR AUTOMATIC ADJUSTMENT OF A VEHICLE TO A PREDETERMINED PERFORMANCE CONDITION

TECHNICAL FIELD

This invention relates to a method and apparatus for automatic adjustment of a vehicle to a predetermined performance condition.

BACKGROUND ART

In many types of motor-sports competitions, it is normal to try to ensure that all participants drive vehicles having identical performance, so that the skill of the driver is what makes the difference, and to reduce the costs of taking part in races, thereby making the competitions accessible even for less wealthy drivers.

To achieve these results, in such competitions use is normally made of various practical solutions, including for example drawing lots for the vehicle to be used; or drawing lots for the vehicle electronic control unit to be used; or even applying seals to vehicle mechanical and electronic components; and when the weight difference between drivers may be a significant factor favouring lighter drivers, equalling out the conditions by adding suitable ballast to the vehicle.

However, all of these techniques are not without limitations and disadvantages that more or less significantly compromise their effectiveness in achieving the above-mentioned objectives.

In fact, with drawing lots for the vehicle, which involves random assignment of a vehicle set up for the race, responsibility for preparing the vehicles in such a way that they are all able to provide the same, identical, performance lies entirely with the competition organisers. Consequently, the competition organisers take on the burden of using considerable resources, with a high cost outlay, due to the need to configure all of the vehicles that will take part in the competition in such a way that they all provide the same, identical performance. In any case, any, even small, remaining differences in the performance of the various vehicles, that sometimes cannot be eliminated, means that the competition is at least partly left to chance.

Also, differences in the weight and anatomical dimensions of the drivers are not compensated in any way by this technique, which also lacks any capacity to act on any vehicle operating faults during the actual race. Such faults, if not promptly corrected, would irremediably penalise the result of the race and, even if corrected by action in the boxes, would still put the vehicle at a disadvantage in terms of its overall race time.

The technique of drawing lots for the electronic control unit makes the engine power output the same for all competitors, but allows sly mechanical changes that increase the vehicle's actual performance. Therefore, this technique calls for strict checks at the end of the competition, to attempt to find any technical improvements and solutions furtively applied to increase the performance of the vehicle of each driver.

Again, this technique fails to compensate the weight and dimensions of the different drivers, often at the expense of the heavier drivers.

The technique of applying seals to vehicle mechanical and/or electronic components does guarantee uniform performance of the components sealed, but allows any alterations to the others, as well as failing to compensate in any way for the morphological features of the driver.

The ballasting technique consists of weighing all of the drivers and making the lightest drivers add weight to their vehicle so as to make the total weight of the vehicle plus driver the same for each of them. However, this technique does not guarantee that performance is the same for each vehicle, since the total weight being equal, the distribution of the component weights in space may significantly affect vehicle performance, so much so that the ballasting technique is often combined with other compensating techniques.

The prior art methods described above show that competition management is complex and onerous; that perfectly equal performance of the vehicles, useful and necessary in order to highlight the skill of the most talented drivers, is certainly not guaranteed; that work to check that the limits imposed have been strictly complied with during the competition involves a capacity for investigation involving multiple inspection activities to be carried out in a relatively short time and which in turn call for qualified personnel and state-of-the-art equipment; and finally, that, despite all of this, in any case we are still left with unpredictability factors that cannot be eliminated, such as mechanical wear, size tolerances, variance of electrical characteristics and so on, which make the actual race conditions different from one driver to the next.

DISCLOSURE OF THE INVENTION

The technical purpose of this invention is to overcome such disadvantages.

As part of that purpose, the primary aim of this invention is therefore to render equal the performance of a set of vehicles of the same type, competing with each other, irrespective of any difference in weight, mechanical wear and/or any parameter external or internal relative to the vehicle that may affect the performance capabilities of the vehicle.

Accordingly, the invention achieves those results with a method and an apparatus for automatic adjustment of the technical characteristics as clearly indicated in the claims herein.

BRIEF DESCRIPTION OF THE DRAWINGS

The advantages of the invention are more apparent in the detailed description which follows, with reference to the accompanying drawings which illustrate an example, non-limiting embodiment of the invention, in which:

FIG. 1 is a schematic overview of a vehicle equipped with an adjusting apparatus according to this invention;

FIGS. 2 and 3 are operating graphs showing a first operating condition of the vehicle of FIG. 1;

DETAILED DESCRIPTION OF PREFERRED EMBODIMENTS OF THE INVENTION

Figure 4:
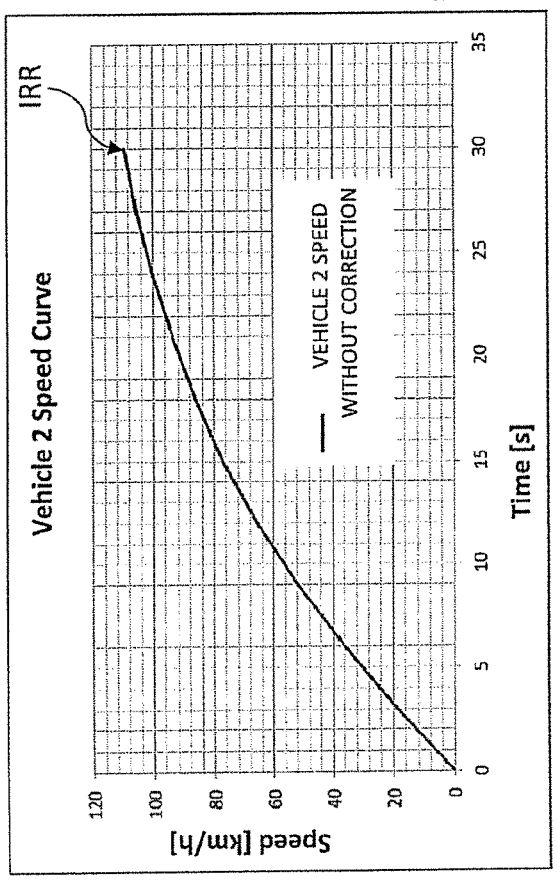
FIGS. 4 and 5 are operating graphs showing a second operating condition of the vehicle of FIG. 1.

With reference to the figures of the accompanying drawings, in FIG. 1 the numeral (1) denotes a motor vehicle, to which there is associated an apparatus (10) for automatic management and adjustment of the vehicle (1) to a predetermined performance condition.

The vehicle (1), whose type will preferably be referred to in this text, is typically a go-kart driven by an electric motor (2). Such a choice of type of vehicle (1) shall be considered by way of example only, without in any way limiting the invention, since, as will become apparent below, the type of vehicle (1) may be completely generic, just as the type of drive unit used for vehicle (1) propulsion may be generic.

The apparatus (10) for automatic management and adjustment basically comprises an input device (3i) for inputting a generic physical quantity (x) selected from those that are significant for characterising the check of a performance feature of the vehicle (1). Depending on the cases, the physical quantity (x) may be of importance in terms of kinematics, dynamics, duration, reliability, or various combinations relating to those aspects, as is generally required in a motor-sports competition.

Therefore, any reference physical quantity (x) may be used, for example selected from the kinematic variables of the vehicle (1) such as its linear velocity, or an angular velocity of one of its rotating parts, or it may be selected from several physical parameters of the vehicle (1) or of its characteristic parts, for example the pressure of the tyres, or the depth of their tread, or the tyre rolling resistance, or which more simply may consist of the weight of the driver detected by suitable sensors or entered as a data item in the apparatus (10) by means of any input device (3i). Even the degree of mechanical wear of certain parts of the vehicle (1) detected and signalled by suitable sensors may be used as a reference physical quantity (x) to be checked for use to express in terms of quantity and quality one or more vehicle (1) performance indicators.

A saving device (3m) associated with the apparatus (10) allows saving of the current values of the checking physical quantity (x), as well as the values of several reference indicators (IRN; IRR) defined by microprocessor means (ECU) by processing data or signals arriving from sensor (4) means integrated in the checking apparatus (10), or in any case outside it but interoperating with it.

The microprocessor means (ECU) are also interfaced with the vehicle (1) propulsion motor (2) for checking generation of its driving power (p1) which is transmitted, by means of a driving shaft (11), to the driving wheels (12) of the vehicle (1).

In use, operation of the apparatus (10) may be described as follows. Having adopted a significant physical quantity (x) for checking a generic aspect of vehicle performance, and set as the nominal reference indicator (IRN) of the performance the value adopted by that physical quantity (x) in a predetermined reference condition, said nominal reference value (IRN) is saved in the saving device (3m) of the apparatus (10).

During a real operating condition of the vehicle (1) that reproduces the same methods as the reference condition, the value adopted by the checking physical quantity (x) is detected, its corresponding real reference indicator is defined (IRR), this is saved in the saving device (3m), then, suitably retrieved by the microprocessor means (ECU), it is compared with the nominal reference indicator (IRN).

If the two indicators coincide or differ by a minimum quantity, within a tolerance, the vehicle (1) is considered to be reproducing in the real condition performance identical to the nominal performance and the adjusting apparatus (10) does not intervene.

If, in contrast, there is a difference between the two reference indicators (IRN, IRR) that is other than zero, or in any case a considerable value established by a suitable threshold, the apparatus (10) intervenes to adjust the real reference indicator (IRR) by increasing or reducing the power (p1) of the motor (2) by suitably managing related output parameters, all of this being done until the real reference indicator (IRR) is identical to the nominal reference indicator (IRN). Consequently, whatever the cause of the deviation of the real performance from the reference condition, for as long as that cause lasts, thanks to a suitable power adjustment, the real performance of the vehicle (1) continues to be effectively identical to the nominal performance.

A first example of this checking method, described with reference to FIGS. 2 and 3, allows the idea behind that adjustment to be made clearer.

Assuming that the significant physical quantity (x) adopted for checking performance is the instantaneous speed of the vehicle evenly accelerated during straight line motion on level ground. The nominal reference indicator (IRN) set is the maximum speed achievable by the vehicle (approximately 118 km/h 30 s after the start of the accelerated motion), that value being understood to be the result actually achieved by the new vehicle (1), configured with of all of its components in the optimum setting conditions and placed in an optimised and suitably defined test condition.

For these conditions, FIG. 3 shows the trend in the driving power generated by the motor (2) of the vehicle (1) and expressed in a graph of Motive power/Motor revolutions per minute (2).

The two graphs shown in FIGS. 2 and 3—to be considered produced by the microprocessor means (ECU)—describe normal operation of the vehicle (1).

Imagine that during a hypothetical competition, unintentionally, for a reason that is not of interest in this text, a real operating condition arises that is different to the nominal condition of FIGS. 2 and 3, for example due to the fact that the pressure of the tyres has fallen compared with the optimum reference conditions. As a result of that fault, it is assumed that the real reference indicator (IRR) of the vehicle (1) no longer corresponds to that of FIGS. 2 and 3, but becomes that corresponding to FIGS. 4 and 5. That is to say, it is assumed that at the time t=30 seconds, it is equal to approximately 104 km/h.

Figure 6:
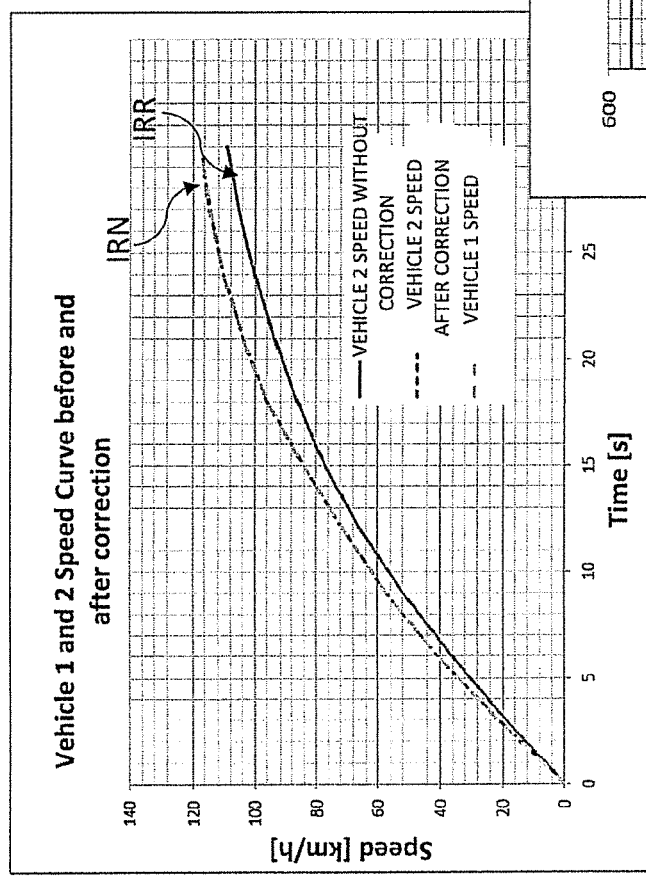
FIGS. 6 and 7 are operating graphs showing a method of adjustment of operation of the vehicle of FIG. 1.
Figure 7:
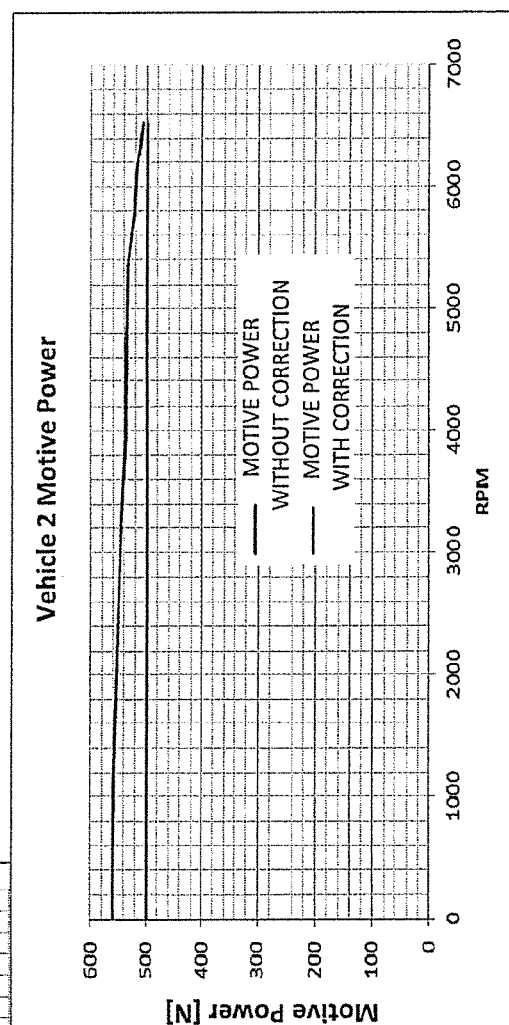

When that happens, the apparatus (10) implements a power adjustment, increasing it (see the motive force correction highlighted in FIG. 7), which raises the operating curve (FIG. 6) in such a way that the vehicle (1) again reproduces the nominal performance, despite the pressure of the tyres still being at the faulty value which is below the optimum value.

Therefore, although an operating fault occurs, vehicle performance is not penalised and the driver of the vehicle (1) remains competitive with the other participants in the competition.

In the example indicated, reference is made to the same vehicle (1) which operates in two different conditions at two different times during the race.

A second example, concerning two different vehicles (1), may be described as follows with reference to the same set of figures from 2 to 7.

In fact, assuming that two identical vehicles (1) take part in the same competition, both prepared for the race in identical conditions and as such able to provide an identical nominal reference indicator (IRN) value—FIGS. 2 and 3—again in this case established for example as the (identical) maximum speed of the two vehicles in the test conditions.

Figure 5:
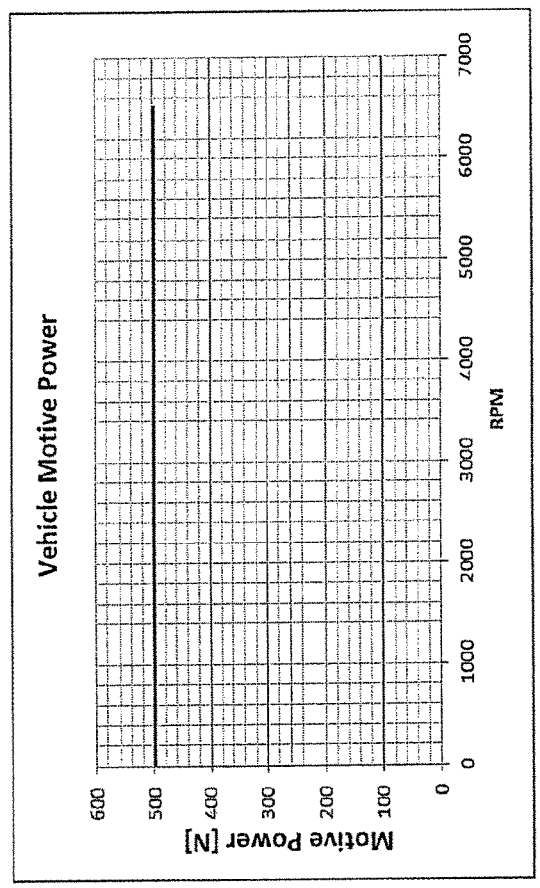

Assuming that the only difference between the two vehicles (1) is attributable solely to the different weights of the drivers: respectively (m1) for a first vehicle (1)—corresponding to FIGS. 2 and 3—and (m2>m1) for the second vehicle (1) which, due to the greater weight (m2), is in the situation shown in FIGS. 4 and 5.

Again in this case, the vehicle (1) with the heavier driver (m2) would no longer be able to supply a real reference indicator (IRR) of performance identical to the nominal reference indicator. In fact, adopting the weight as the significant physical quantity (x) for checking performance, and having entered the numerical value of that weight either as an input data item entered into the adjusting apparatus (10) using a keyboard, or as a value of a measurement signal acquired by the apparatus (10) following detection by a suitable sensor (for example, a load cell associated with the driver's seat), then the weight difference (m2−m1) must be assigned responsibility for the deviation of the real reference indicator (IRR) from the nominal reference indicator (IRN) (again in this case, the maximum speed of the vehicle (1) or a speed related to it such as the rotational speed of the driving axle (11)).

In this case too, when that situation occurs, the apparatus (10) implements an automatic adjustment that translates into the generation of a suitably increased power (p1) (FIG. 7) which offsets the negative effect of the greater weight (m2) of the driver of the second vehicle (1), who thanks to the action of the apparatus (10), again competes in the same, identical conditions as the driver of the vehicle (1) whose weight is (m1).

In light of the examples provided, it becomes apparent that the checking physical quantity (x) may vary in terms of the physical type and the source. In fact, said physical quantity (x) could be acquired by the vehicle (1) either as a data item or as a signal even arriving from any sensors that are part of the normal kit of the vehicle (1), obviously provided that they are suitably interfaced with the microprocessor means (ECU) that process data, operating variables and parameters which are in any way significant to vehicle (1) performance.

The definition of the reference indicator (IRN, IRR) may be equally general. It may be a data item or a numeric signal, or even the result of a function implemented and processed in the microprocessor means (ECU) by suitable software.

In other words, by means of suitable management and modulation of the motor (2) operating parameters it is possible—obviously within a range established by the operating limits of the vehicle (1)—to modulate and manage with increases or reductions (depending on the real, instantaneous vehicle (1) performance requirements) the power (p1) actually supplied by the motor (2), that is to say, the effective propulsion power (p2) to the wheels (12) of the vehicle (1).

In use, the adjusting system (10), allows, amongst other things, calibration of the performance of the vehicle (1) to a specific reference condition, saving of the calibrated conditions and then comparison of all vehicle (1) actual operating conditions to those calibrated conditions.

Figure 8:
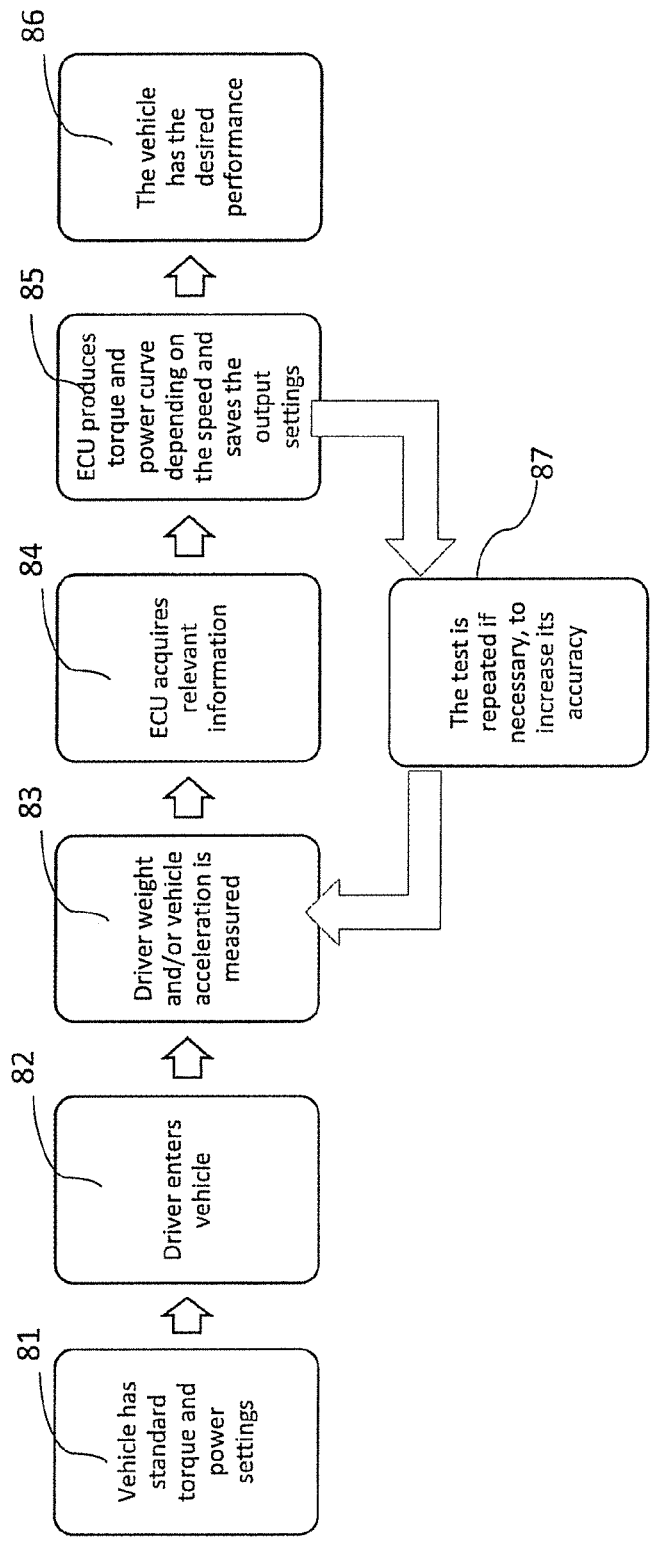
FIG. 8 depicts a block diagram of a process for setting up power correction to the vehicle of FIG. 1.

Concerning calibration of the apparatus (10) to the reference condition and for a vehicle subject to a weight (m2) greater than the standard reference weight (m1), FIG. 8 shows a block diagram that explains the process of setting up the power correction that allows the vehicle (1) to achieve and keep the optimum performance configuration.

In fact, and more specifically, the block (81) indicated in FIG. 8 shows an initial condition of the vehicle (1) in which it is assumed to be set to the nominal standard power conditions.

In a subsequent step, shown with block (82), the driver enters the vehicle (1). In a subsequent step (83), the weight of the driver and/or the acceleration of the vehicle are detected and measured.

A block (84) symbolically indicates the steps with which the checking system (10) acquires the relevant information, which in block (85) is then processed to obtain the power values (p1) that the motor (2) will have to actually supply. Should the performance in terms of propulsive power (p1) prove to be suitable and/or acceptable, the vehicle set-up process would end with a block (86).

If not, a feedback block (87) would take the system (10) back to block (83) in which the motor (2) adjusting parameters would be remodulated, after which, by cyclically performing steps (84), (85), (87) and (83) the vehicle (1) is repeatedly reconfigured until even for the vehicle (1) with the weight (m2) an actual propulsive power (p2) as near as possible to the power (p1) of the vehicle (1) with the weight (m1) in the reference condition is obtained. Once that has been achieved, the adjusting process reaches the end in block (86).

In conclusion, the apparatus (10) according to the invention operates by implementing a method comprising the steps of:
 detecting at least one significant physical quantity (x) for checking the performance of the vehicle (1);
 defining a reference indicator (IRN; IRR) correlated with that physical quantity (x);
 saving at least one value of said reference indicator (IRN) in a predetermined nominal reference condition;
 detecting at least one value of a said reference indicator (IRR) in a real operating condition of the vehicle (1);
 comparing said nominal reference indicator (IRN) and real reference indicator (IRR) and, if their values are different from each other,
 implementing a correction of the driving power (p1) of the vehicle (1) to compensate for the ascertained difference between said indicators.

The invention achieves the proposed aims, also providing the additional advantages of high levels of operating effectiveness and stability, as well as being inexpensive to make and use.

The invention described above is susceptible of evident industrial application. It may also be modified and adapted in several ways without thereby departing from the scope of the following claims.

Moreover, all details of the invention may be substituted by technically equivalent elements.

The invention claimed is:

1. A method for automatic adjustment of a vehicle comprising:
 detecting at least one physical quantity for checking performance of the vehicle, wherein the at least one physical quantity includes a tire status parameter selected from at least one of: pressure, temperature, tread compound, or wear;
 defining at least one pair of reference indicators correlated with the at least one physical quantity;
 saving a nominal reference indicator, wherein the nominal reference indicator includes at least one value of the at least one pair of reference indicators in a predetermined nominal reference condition;

detecting a real reference indicator, wherein the real reference indicator includes at least one value of the at least one pair of reference indicators in a real operating condition of the vehicle;

comparing the nominal reference indicator and the real reference indicator to ascertain a difference; and upon ascertaining that the difference that exceeds a first threshold, implementing a correction to compensate for the difference ascertained so as to adjust a driving power generated by a motor of the vehicle.

2. The method according to claim 1, further comprising repeating steps of detecting, comparing and of implementing the correction until a degree of compensation of the difference between the nominal reference indicator and the real reference indicators meets a second threshold.

3. The method according to claim 1, wherein the at least one physical quantity includes a maximum speed that can be reached by the vehicle.

4. The method according to claim 3, wherein the predetermined nominal reference condition is determined based on an accelerated straight line motion of the vehicle on level ground.

5. The method according to claim 3, wherein the at least one physical quantity is correlated with an angular speed of a rotating unit of the vehicle.

6. The method according to claim 1, wherein the at least one physical quantity includes a maximum driving torque of the vehicle.

7. The method according to claim 1, wherein the at least one physical quantity is includes at least one anatomical parameter of a driver of the vehicle.

8. The method according to claim 7, wherein the at least one anatomical parameter includes a weight of the driver.

9. An apparatus for automatic management and adjustment of a performance of a vehicle, the apparatus comprising:

an input device configured to receive a value of at least one physical quantity relating to the performance of the vehicle;

a saving device configured to save at least one value of a nominal performance reference indicator in a predetermined condition of the vehicle and at least one value of a real reference indicator relating to vehicle performance in a real condition; and an electronic control unit configured to:
receive the value of the at least one physical quantity;
compare the at least one value of the nominal performance reference indicator and the at least one value of the real performance reference indicator; and
upon determining that a difference between the at least one value of the nominal performance reference indicator and the at least one value of the real performance reference indicator exceeds a threshold, implement a compensating correction so as to adjust a driving power generated by a motor of the vehicle.

10. The apparatus according to claim 9, wherein the input device is interfaced with an output of at least one sensor unit configured to detect at least one said physical quantity relating to the performance of the vehicle.

11. The apparatus according to claim 9, wherein the at least one physical quantity includes a maximum speed that can be reached by the vehicle.

12. The apparatus according to claim 9, wherein the at least one physical quantity is correlated with an angular speed of a rotating unit of the vehicle.

13. The apparatus according to claim 9, wherein the at least one physical quantity is a maximum torque of the vehicle.

14. The apparatus according to claim 9, wherein the at least one physical quantity is includes at least one anatomical parameter of a driver of the vehicle.

15. The apparatus according to claim 9, wherein the at least one physical quantity includes a tire status parameter selected from at least one of: pressure, temperature, tread compound, or wear.

* * * * *